(12) United States Patent
Depalma et al.

(10) Patent No.: US 7,873,738 B2
(45) Date of Patent: Jan. 18, 2011

(54) SESSION INITIATION PROTOCOL SYSTEM TIMEOUT TIMER METHOD

(75) Inventors: Louis C. Depalma, Gilbert, AZ (US); Rose M. Dees, Mesa, AZ (US); Thomas Peter Emmons, Jr., Mesa, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 2031 days.

(21) Appl. No.: 10/830,845

(22) Filed: Apr. 23, 2004

(65) Prior Publication Data

US 2005/0240674 A1 Oct. 27, 2005

(51) Int. Cl.
*G06F 13/00* (2006.01)
(52) U.S. Cl. ...................................... 709/230
(58) Field of Classification Search ................. 709/230
See application file for complete search history.

(56) References Cited

U.S. PATENT DOCUMENTS

| | | | | |
|---|---|---|---|---|
| 6,434,143 | B1* | 8/2002 | Donovan | 370/356 |
| 6,735,621 | B1* | 5/2004 | Yoakum et al. | 709/218 |
| 2004/0132452 | A1* | 7/2004 | Lee | 455/445 |

* cited by examiner

*Primary Examiner*—Robert B Harrell

(57) ABSTRACT

The present method provides for a session initiation protocol timing arrangement which facilitates instant communications in a packet data communication system (50). Each network server (15-25) sets a time out timer (92) which is coordinated with each of the downstream network servers. Network server (15), for example, sets a time out timer value which is selectable by the system operator. Subsequent network servers (20 and 25) then set the value of the time out timer to be that of the originating server (15) or client (10) less a fixed time such as one second. Further, a provisional message (118) is sent through the network to avoid expiration of the time out timer in upstream stages.

19 Claims, 3 Drawing Sheets

SESSION INITIATION PROTOCOL SYSTEM TIMEOUT TIMER METHOD

BACKGROUND OF THE INVENTION

The present invention pertains to packet data communications systems and more particularly to session initiation protocol time out between clients and network servers.

Internet protocol (IP) using session initiation protocol (SIP) enables modern communication networks to provide many packet data services including voice to wireless users in a dispatch environment. Session initiation protocol provides for certain methodology for timing overall communications between clients and servers and servers and other servers in a network to avoid a miscommunication or lack of communication. Such situation is called a time out period.

The session initiation protocol standard timer value is initially set at one-half second and is doubled for each successive retry. The overall transaction time out timer is set for a maximum of 32 seconds and would automatically expire prior to sending the maximum number of retries.

Typically data packets are sent through several "network hops". A hop is a transmission of the data packet from one node to another. For example, from an originating server to a group or interconnecting server or from an interconnecting server to a terminating server. The number of network hops depends upon the particular routing of the data packet. As a data packet is transmitted from network hop to network hop, the time out timer of the originating server is constantly running and for lack of response by down stream network servers, it may time out. Between the time of initiation and time out by a network server, several retries may have been attempted by the originating server. The downstream network servers have no knowledge of the time out of the upstream servers. This results in call cancellations and drops and further a race condition exists between network servers. Some network servers may still be processing the packet data while upstream servers are attempting to cancel the packet data transmission since a time out of the upstream network server has occurred.

Further, for particular kinds of packet data uses such as dispatch and specifically push-to-talk functions, a time out time period of 30 seconds is a long time for the push-to-talk type service.

In a session initiation protocol based packet communication system, the time out timer is governed by document RFC2543BIS-09. No resolution of the above problem or recognition of the problem is expressed for the time out timers in this document.

Accordingly, it would be highly desirable to have a time out timer coordination method between successive "network hops" or network servers.

DESCRIPTION OF THE PREFERRED EMBODIMENT OF THE INVENTION

Figure 1:
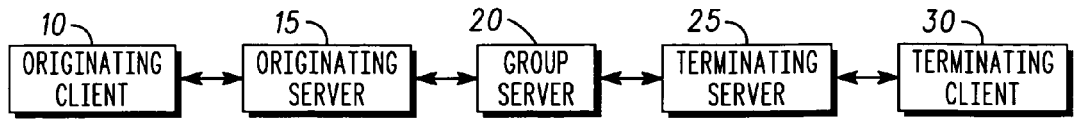
FIG. 1 is a block diagram of a packet data communication network in accordance with the present invention.

Referring to FIG. 1, a block diagram of a packet data communication system 50 which employs session initiation protocol (SIP) is shown. Communication system 50 is shown and includes an originating client 10 which is coupled to an originating server 15 which in turn is coupled to a group server 20. Group server 20 is coupled to terminating server 25. Finally, terminating server 25 is coupled to a terminating client 30. Originating client 10 is attempting to connect and communicate with terminating client 30. One application of communication system 50 may be between two clients 10 and 30 communicating in a push-to-talk service arrangement.

As an example, originating client 10 is attempting to communicate with terminating client 30. A SIP invite request is sent by originating client 10 to originating server 15. The message flow for this purpose of consideration is from left to right. That is, originating client 10 is upstream with regard to originating server 15; and originating server 15 is downstream with respect to originating client 10. Terminating client 30 is downstream with respect to each of the blocks of FIG. 1, that is, originating client 10, originating server 15, group server 20 and terminating server 25.

Generally, each server 15-25 provides for timing of messages sent to the next server downstream. For lack of acknowledgment each client and server returns an acknowledge message in response to a SIP invite message. If messages become delayed or lost a retry of the SIP invite message, for example, is attempted. The present invention resets the retry timer for each retry instead of linearly or exponentially increasing it. Further, each time a SIP response message is received from a downstream unit (response message=1XX), the retry timer is reset and the overall time out timer is set with a period of one second greater than the next node (server or client) upstream. As a result any subsequent provisional SIP responses (1XX) would reset the time out timer prior to its expiration. Further, this invention calls for the use of a provisional response code (181 forward) to be used for each node upstream to be returned to the previous downstream node. This 181 forward response code allows the time out timer to be reset and avoids canceling any retries.

Figure 2:
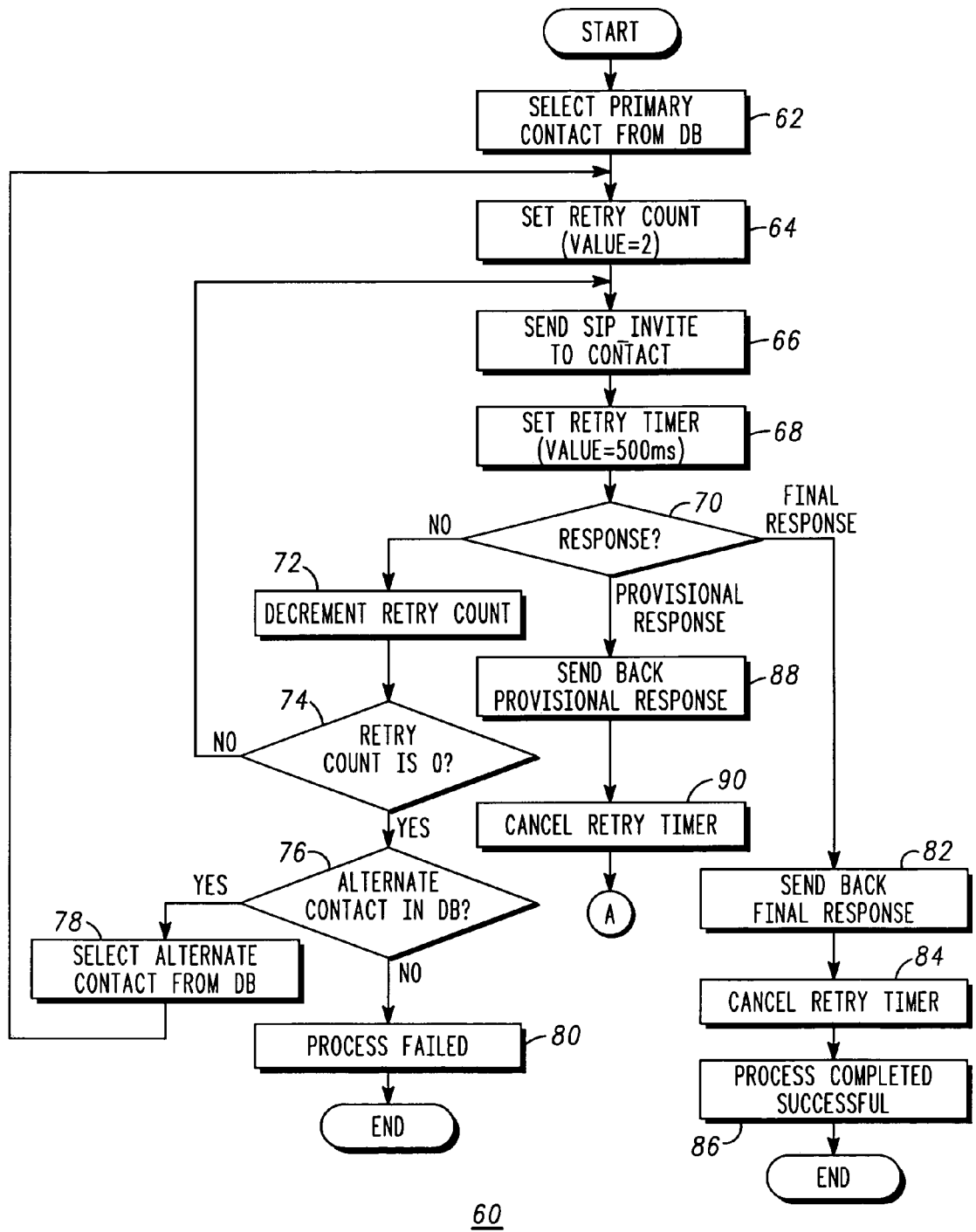
FIGS. 2 and 3 are flow charts of a time coordination method in accordance with the present invention.
Figure 3:
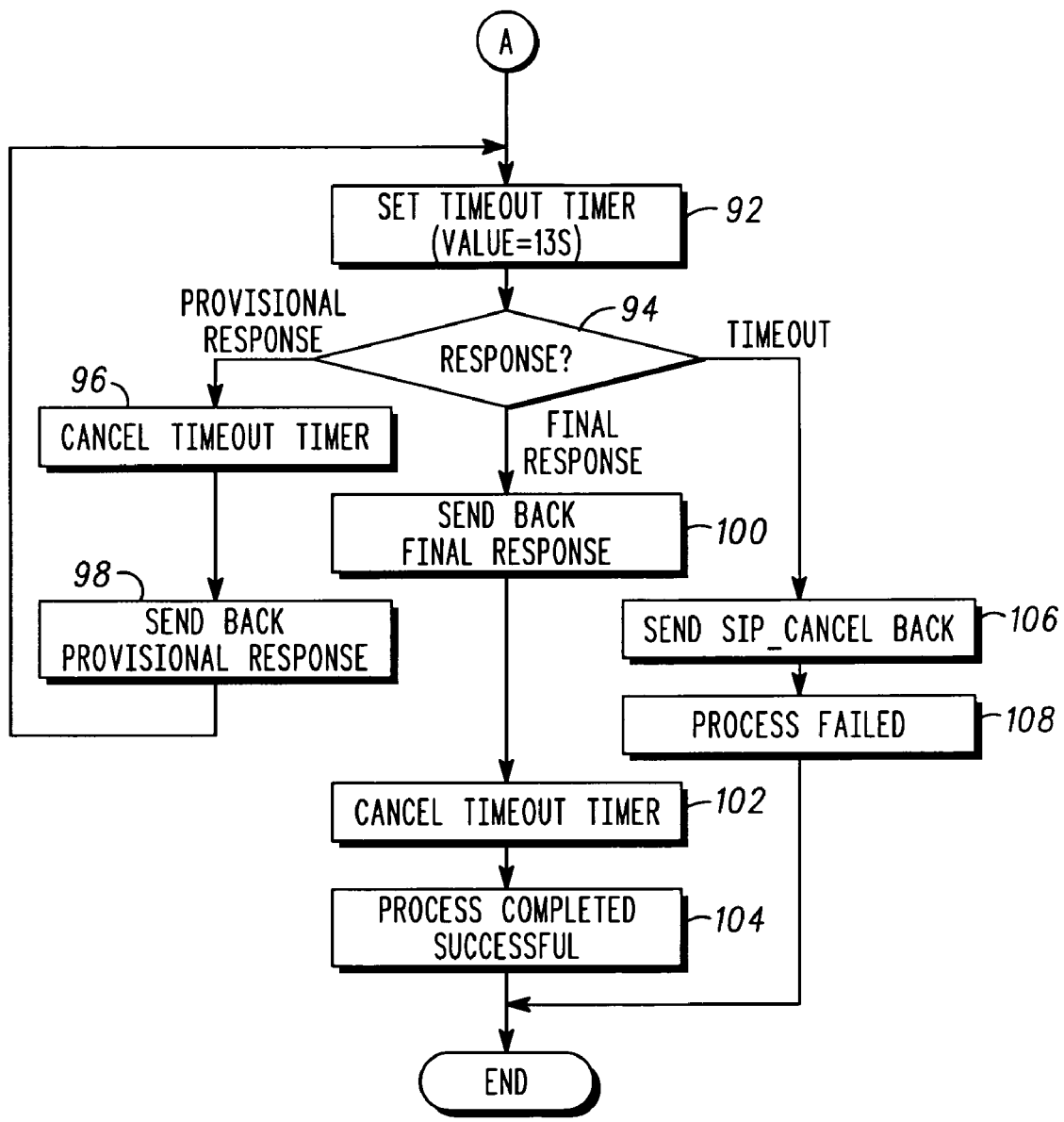

Referring to FIGS. 2 and 3, a flow cart of the time out timer method 60 is shown. The method is started and block 62 is entered. Block 62 selects a primary contact from an associated database. That is, once a server receives a SIP invite request 110 from a client or an upstream server, the database is consulted to determine the next primary server or end server which may handle this invite request. The contact is either the next server downstream or the terminating client depending on the flow through the communication system 50.

Next, a retry count is set equal to two. This counter keeps the count of the number of retries made by a server. The retry count may be set differently for different servers depending upon the needs of the network operator and other traffic considerations.

Next, block 66 sends a SIP invite to the contact obtained from the database in block 62. Again, the contact is either the next server or the terminating client. For example, using FIG. 1, since originating server 15 has already obtained the SIP invite from originating client 10, the next contact for originating server 15 would be group server 20. Therefore, the SIP invite would be sent from originating server 15 to group server 20.

Next, the retry timer is set to a value of one-half second, block 68. The retry timer value is also settable based upon the needs of the system operator and other traffic conditions. The server then waits for a response from the next server downstream or terminating client. If no response is received from the next downstream server, block 70 transfers control to block 72 via the no path. Block 72 decrements the retry counter. Remember originally the retry counter in this example was set to two. Next, block 74 determines whether the retry counter is zero. If the retry counter is zero, three retries of sending the SIP invite to the next server have been attempted. Block 74 then transfers control to block 76 via the yes path. Block 76 determines whether an alternate contact is included in the database. Remember that a contact is a next server or terminating client in the downstream flow. For terminating client an alternating contact may be a computer instead of a cell phone or telephone. If there is no alternate contact in the database, block 76 transfers control to block 80 via the no path. Block 80 indicates that the process has failed and ends the method.

If an alternate contact is included in the database, block 76 transfers control to block 78 via the yes path. Block 78 selects the alternate contact from the database. Then block 78 transfers control to block 64 which reestablishes the retry count at two. The method then sends the SIP invite to the alternate contact, block 66, sets the retry timer to one-half second, block 68 and waits.

If the server sending the SIP invite receives a final response, for example, a SIP 200-699 message, block 70 transfers control to block 82 via the final response path. Block 82 sends back the final response message to the previous contact. The final response message is not sent to the originating client if that was the contact. The retry timer is canceled, block 84. The process is indicated as completed successfully, block 86. Then the process is ended.

If the server sending the SIP invite detected a provisional response, block 70 transfers control to block 88 via the provisional response path. Block 88 sends back the provisional response indication to the upstream server. Next, the retry timer is canceled, block 90. Then block 92 sets the timeout timer value equal to 13 seconds. The value of the timeout timer is settable by the system operator depending upon the system operator's needs and other traffic conditions. Each downstream server sets the time out timer to approximately one second less than the upstream server or originating client. This prevents the cascading of SIP cancel messages.

Next, block 94 waits for a response. If a provisional response is received, block 94 transfers control to block 96 via the provisional response path. A provisional response is a SIP message between 100 and 199. Block 96 cancels the time out timer. Next, block 98 sends back (upstream) the provisional response, unless the upstream network node was the originator. Then block 98 transfers control to block 92 to set the time out timer and wait.

If the received response is a time out, block 94 transfers control to block 106 via the time out path. Block 106 sends a SIP cancel message back upstream, unless the previous upstream node was the originating client. Then the process is indicated as having failed, block 108 and the method is ended.

If a final response was received, block 94 transfers control to block 100 via the final response path. Block 100 sends the final response message back to the upstream server, unless the upstream unit is the originating client. Next, the time out timer is canceled, block 102. The process is then indicated as being completed successfully, block 104. The method is then ended.

Figure 4:
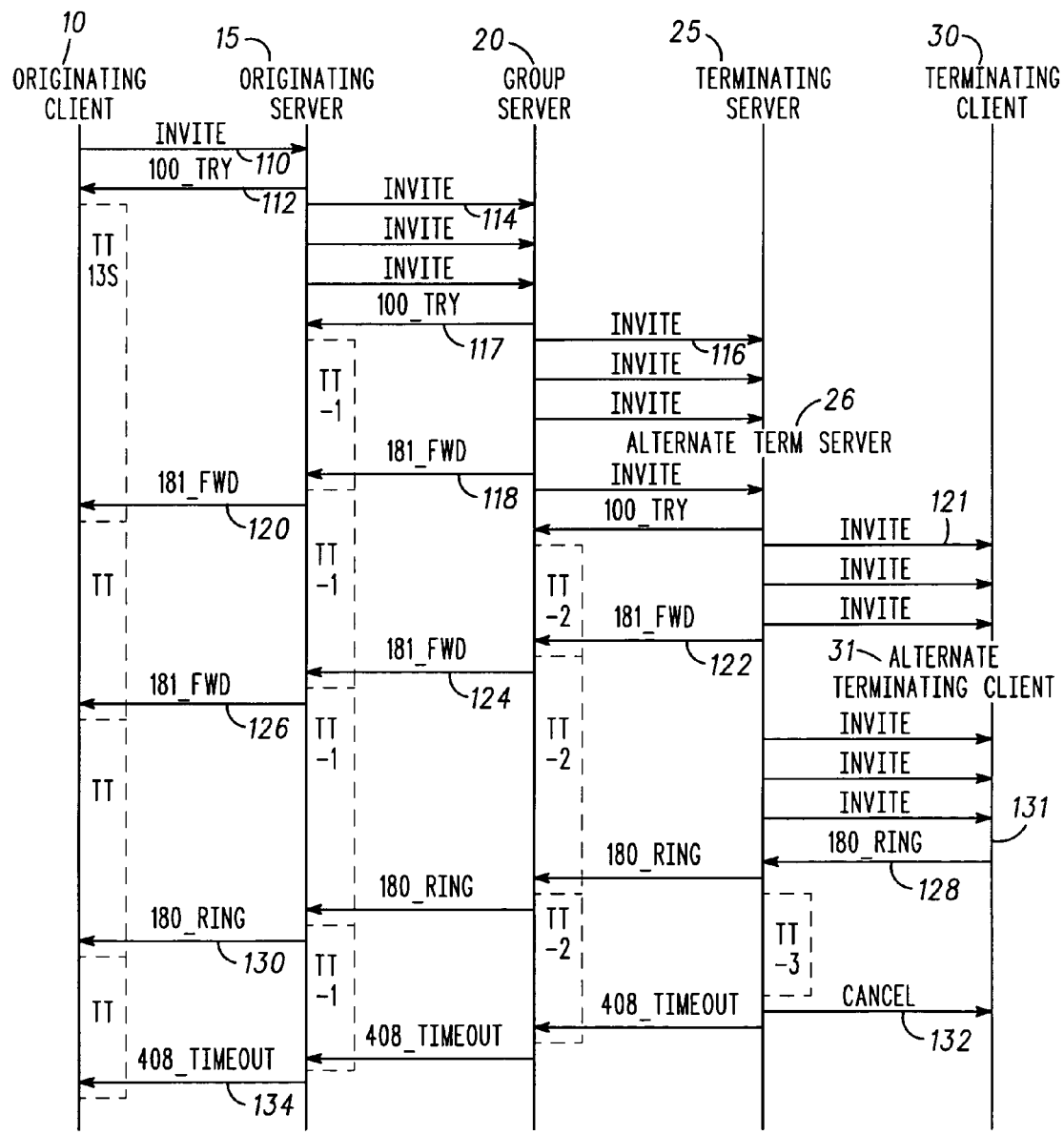
FIG. 4 is a message flow diagram depicting network server coordination in accordance with the present invention.

FIG. 4 depicts a message flow diagram which diagrammatically depicts a sample message flow for the method of FIGS. 2 and 3. Originating client 10 sends a SIP invite message 110 to originating server 15. The retry timer is initialized to one-half second (not shown). Originating server 15 may return a SIP 100 trying message 112 to originating client 10. Originating server 15 also forwards the SIP invite message 114 to group server 20. Two retries of the SIP invite message are shown being transmitted from originating server 1 to group server 20.

Group server 20 finally responds to one of the SIP invites with a 100 trying message to upstream originating server 15. This 100 trying message is not returned to the originating client 10.

Group server 20 then sends the SIP invite 116 to terminating server 25. Subsequently, two retries are made to again send the SIP invite to terminating server 25. The SIP invite message is then alternately routed to a terminating server 26 and when the SIP invite message is resent a SIP 100 trying message 117 is returned from terminating server 26 to group server 20.

Further, prior to sending the 100 trying message 117, group server 20 sent a 181 forward message to originating server 15 indicating that the call was being routed to an alternate terminating server. Originating server 15 sent the 181 forward message to originating client 10. This enabled originating client 10 to reset the time out timer prior to its expiration. In addition, the time out timer for originating server 15 is set to the value of the time out timer (TT) less one second. Additionally, the time out timer of group server 20 is set to the time out time period of originating client 10, TT−2 seconds since it is two hops downstream with respect to originating client 10.

Alternate terminating server 26 then attempts to forward the SIP invite 121 to the terminating client 30. Again, two successive retries are made unsuccessfully. The method of FIG. 2 then selects an alternate contact or in this case terminating client from the database. This corresponds to perhaps a cell phone when the terminating client was unable to be reached at the computer.

The alternate terminating client 31 is then selected.

Meanwhile, the terminating server 25 sends a 181 forward message 122 to the group server 20. This message is then cascaded in messages 124 and 126 back to the originating client 10. As a result the time out timer is reset prior to expiration.

When the alternate terminating client 31 is rung on the cell phone, the resultant message 180 ring 128 is sent to terminating server 25 and cascaded back through the upstream network as 180 ring message 130 to originating client 10.

Lastly, the terminating server 25, in this example, was unable to complete the coupling to the alternate client 31 and as a result, time out timer 131 expired. The value of time out timer was the original value of timer set by originating client 10 minus three seconds since there were three hops between the originating server and the terminating server. As a result, terminating server 25 sends a cancel message 132 to the alternate terminating client 31. Further, a 408 time out message 134 is sent upstream through the network back to the originating client 10. This indicates the call was not complete because of time out.

As can be seen from the above explanation, the present method prevents premature time out and cascading of time outs throughout the communication system. The total response time by the system is not a fixed number but is a function of the number of "hops" made through the system and the number of alternate elements in the system. This method allows for a variable number of provisional attempts or retries. Further, this method resets upstream timers by the sending of a provisional 181 forward message to stop time out timers. This method eliminates race conditions among the various servers of the communication system. Further, this method provides for service operator selection of several parameters.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a Session Initiation Protocol (SI) based communication system, a timeout timer method for SIP messages transmitted among clients and servers, the timeout timer method executing on the clients and the servers comprising steps of:
sending a SIP message from an upstream server to a downstream server;
setting by the upstream server a first value of a first timeout timer for the upstream server;
setting by the downstream server a second timeout timer for the downstream server, a second value of the second timeout timer being one second less than the first value of the first timeout timer; and,
forwarding the SIP message by the upstream server to the downstream server.

2. In a SIP based communication system, the timeout timer method as claimed in claim 1, wherein there are further included steps of:
selecting by the upstream server a retry count value; and,
selecting by the upstream server a retry timer value.

3. In a SIP based communication system, a timeout timer method as claimed in claim 2, wherein in response to expiration of the retry timer there are further included steps of:
decrementing the retry count value by one;
determining whether the retry count value is equal to zero; and,
if the retry count value is not equal to zero, iterating the step of sending the SIP message from the upstream server to the downstream server.

4. In a SIP based communication system, the timeout timer method as claimed in claim 3, wherein if the retry count value is equal to zero, there is further included a step of determining whether an alternate contact for the SIP message exists.

5. In a SIP based communication system, the timeout timer method as claimed in claim 2, wherein there is further included a step of maintaining an initial value of the retry timer value for subsequent retries.

6. In a SIP based communication system, the timeout timer method as claimed in claim 1, wherein there is further included a step of receiving a provisional message by the upstream server, said provisional message indicating an alternate activity by the SIP based communication system.

7. In a SIP based communication system, the timeout timer method as claimed in claim 6, wherein responsive to the provisional message, the upstream server cancels its timeout timer.

8. In a SIP based communication system, the timeout timer method as claimed in claim 7, wherein there is further included a step of sending the provisional message by the upstream server to the downstream server.

9. In a SIP based communication system, the timeout timer method as claimed in claim 1, wherein there is further included a step of receiving a final response message by the downstream server, said final response message corresponding to a successful operation by the SIP based communication system.

10. In a SIP based communication system, the timeout timer method as claimed in claim 9, wherein there is further included a step of sending the final response message by the downstream server to the upstream server.

11. In a SIP based communication system, the timeout timer method as claimed in claim 10, wherein there is further included a step of canceling by the downstream server its timeout timer responsive to the final response message.

12. In a SIP based communication system, the timeout timer method as claimed in claim 1, wherein there are further included steps of:
receiving by the downstream server a timeout response; and,
responsive to the timeout response, sending by the downstream server a cancel message to the upstream server.

13. In a SIP based communication system, the timeout timer method as claimed in claim 1, wherein the step of sending the SIP message includes a step of sending a SIP invite message.

14. In a Session Initiation Protocol (SIP) based communication system, a timeout timer method among network nodes, the timeout timer method executing on network nodes comprising the steps of:
sending a SIP message from a first network node to a second network node;
setting by the first network node a first value of a first timeout timer for the first network node; and,
setting by the second network node a second value of a second timeout timer for the second network node, the second value being one second less than the first value.

15. In a SIP based communication system, a timeout timer method as claimed in claim 14, wherein there is further included a step of sending a provisional message from the second network node to the first network node, the provisional message indicating that the SIP based communication system is processing alternate routing.

16. In a SIP based communication system, a timeout timer method as claimed in claim 15, wherein responsive to the provisional message there is further included a step of stopping the second timeout timer.

17. In a SIP based communication system, a timeout timer method as claimed in claim 16, wherein there is further included steps of:
sending by the first network node the provisional message to a previous network node; and,
stopping by the first network node the first timeout timer.

18. In a SIP based communication system, a timeout timer method as claimed in claim 14, wherein the SIP based communication system includes a dispatch communication system supporting push-to-talk services.

19. In a SIP based communication system, a timeout timer method as claimed in claim 14, wherein the SIP based communication system includes an iDEN communication system.

* * * * *